United States Patent
Wong

[19]

[11] Patent Number: 6,145,049
[45] Date of Patent: Nov. 7, 2000

[54] METHOD AND APPARATUS FOR PROVIDING FAST SWITCHING BETWEEN FLOATING POINT AND MULTIMEDIA INSTRUCTIONS USING ANY COMBINATION OF A FIRST REGISTER FILE SET AND A SECOND REGISTER FILE SET

[75] Inventor: David Wong, San Diego, Calif.

[73] Assignee: STMicroelectronics, Inc., Carrollton, Tex.

[21] Appl. No.: 08/999,206

[22] Filed: Dec. 29, 1997

[51] Int. Cl.$^7$ ...................................................... G06F 9/48
[52] U.S. Cl. ........................... 710/267; 709/108; 712/228
[58] Field of Search ............................ 709/108; 710/267; 712/228

[56] References Cited

U.S. PATENT DOCUMENTS

| | | | |
|---|---|---|---|
| 4,945,510 | 7/1990 | Maeda et al. | 714/15 |
| 5,050,067 | 9/1991 | McLagan et al. | 709/108 |
| 5,142,677 | 8/1992 | Ehlig et al. | 709/108 |
| 5,222,241 | 6/1993 | Murakami et al. | 712/228 |
| 5,535,397 | 7/1996 | Durante et al. | 710/267 |
| 5,713,038 | 1/1998 | Motomura | 712/41 |
| 5,742,791 | 4/1998 | Mahalingaiah et al. | 711/146 |
| 5,928,356 | 7/1999 | Golliver et al. | 712/228 |

OTHER PUBLICATIONS

ST486DX/DX2 Databook –1st Edition, SGS–Thomson Microelectronics, Jul. 1994.

*Primary Examiner*—Kenneth S. Kim
*Attorney, Agent, or Firm*—Theodore E. Galanthay; Lisa K. Jorgenson

[57] ABSTRACT

A system and method is provided that adds another floating point register set in the floating point execution unit of a microprocessor. Thus, when the floating point state, or environment is stored as an image into memory, it is also stored as a copy in the additional internal registers. When the state, or environment, is to be restored the necessary information (data and/or instructions) is normally present in the additional registers, thus saving CPU cycles by avoiding reloading the image from memory. The present invention allows for either of the two register sets (or a combination thereof) to be, at a given point in time, the working set, with the other being a shadow register set. All of the memory write cycles are monitored (snooped) to determine if the information in the on-chip image has been altered, since the last store operation. The shadowed register file will allow the state of the floating point register file to be kept "as is" on the occurrence of a task switch.

12 Claims, 5 Drawing Sheets

| CURRENT STATE | | INPUTS | | | | | | | NEXT STATE | |
|---|---|---|---|---|---|---|---|---|---|---|
| ENV POINTER BIT | REG POINTER BIT | is_fnsave | is_frstor | is_fnstenv | is_fldenv | is_match | env_dirty bit | reg_dirty bit | ENV POINTER BIT | REG POINTER BIT |
| 0 | 0 | 0 | 0 | 1 | 0 | x | x | x | 1 | 0 |
| 0 | 0 | 0 | 0 | 0 | 1 | 1 | 0 | x | 1 | 0 |
| 0 | 0 | 1 | 0 | 0 | 0 | x | x | x | 1 | 1 |
| 0 | 0 | 0 | 1 | 0 | 0 | 1 | 0 | 0 | 1 | 1 |
| ELSE – NO CHANGE | | | | | | | | | | |
| 0 | 1 | 0 | 0 | 1 | 0 | x | x | x | 0 | 0 |
| 0 | 1 | 0 | 0 | 0 | 1 | 1 | 0 | x | 1 | 1 |
| 0 | 1 | 1 | 0 | 0 | 0 | x | x | x | 1 | 1 |
| 0 | 1 | 0 | 1 | 0 | 0 | 1 | 0 | 0 | 1 | 0 |
| ELSE – NO CHANGE | | | | | | | | | | |
| 1 | 0 | 0 | 0 | 1 | 0 | x | x | x | 0 | 0 |
| 1 | 0 | 0 | 0 | 0 | 1 | 1 | 0 | x | 0 | 0 |
| 1 | 0 | 1 | 0 | 0 | 0 | x | x | x | 0 | 1 |
| 1 | 0 | 0 | 1 | 0 | 0 | 1 | 0 | 0 | 1 | 0 |
| ELSE – NO CHANGE | | | | | | | | | | |
| 1 | 1 | 0 | 0 | 1 | 0 | x | x | x | 0 | 1 |
| 1 | 1 | 0 | 0 | 0 | 1 | 1 | 0 | x | 0 | 1 |
| 1 | 1 | 1 | 0 | 0 | 0 | x | x | x | 0 | 0 |
| 1 | 1 | 0 | 1 | 0 | 0 | 1 | 0 | 0 | 1 | 1 |
| ELSE – NO CHANGE | | | | | | | | | | |

FIG. 8

| CURRENT STATE | | INPUTS | | | | | NEXT STATE | |
|---|---|---|---|---|---|---|---|---|
| ENV DIRTY BIT | REG DIRTY BIT | is_fnsave | is_frstor | is_fnstenv | is_fldenv | is_match | ENV DIRTY BIT | REG DIRTY BIT |
| 0 | 0 | 0 | 0 | 1 | 0 | X | 0 | 1 |
| 0 | 0 | 0 | 0 | 0 | 1 | 1 | 1 | 1 |
| 0 | 0 | 0 | 1 | 0 | 0 | 1 | 1 | 1 |
| 0 | 0 | ELSE – NO CHANGE | | | | | 0 | 0 |
| 0 | 1 | 0 | 0 | 0 | 1 | 1 | 1 | 1 |
| 0 | 1 | 1 | 0 | 0 | 0 | X | 0 | 0 |
| 0 | 1 | ELSE – NO CHANGE | | | | | 0 | 1 |
| 1 | 1 | 0 | 0 | 1 | 0 | X | 0 | 1 |
| 1 | 1 | 1 | 0 | 0 | 0 | X | 0 | 0 |
| 1 | 1 | ELSE – NO CHANGE | | | | | 1 | 1 |

METHOD AND APPARATUS FOR PROVIDING FAST SWITCHING BETWEEN FLOATING POINT AND MULTIMEDIA INSTRUCTIONS USING ANY COMBINATION OF A FIRST REGISTER FILE SET AND A SECOND REGISTER FILE SET

CROSS REFERENCE TO RELATED APPLICATIONS

U.S. patent application entitled "SYSTEM AND METHOD OF SAVING AND RESTORING REGISTERS IN A DATA PROCESSING SYSTEM", having Ser. No. 08/999,298, filed on Dec. 29, 1997, and assigned to the assignee of the present invention.

BACKGROUND OF THE INVENTION

1. Field of the Invention

The present invention generally relates to a method and apparatus for saving and restoring the state of various registers in a microprocessor. More particularly, a system is provided which allows the state of a floating point execution unit to be restored without requiring all of the data to be restored from memory.

2. Description of Related Art

Based upon consumer demands for increased multimedia capabilities and functionality, the computer industry has responded with enhancements and new technology that will aid in the processing of multimedia computer software applications. One example is the multimedia extensions (MMX) to the Intel microprocessor architecture. These MMX instructions provide capabilities that will allow software vendors to create applications with enhanced multimedia functions.

The architecture of Intel microprocessors is such that MMX instructions use the floating point unit (FPU) registers for instruction computation. An MMX instructions once executed shall write over the previous floating point state. Thus, the previous floating point state cannot be preserved without first saving such FP state to memory. The previous floating point state can be restored by loading the FP information from memory, and the floating point instructions can continue execution from the FP state that is remaining. The Intel MMX architecture requires empty out (by executing an EMMS instruction) the state that the MMX instructions accumulate before the floating point instructions are allowed to be executed. Otherwise, a floating point exception will be generated. In other words, the MMX state must be erased and the floating point state must re reset before the floating point instructions can be executed without causing a floating point exception. Thus, the MMX state cannot be preserved without first being saved into memory, before execution of the EMMS instruction. The previous MMX state can be restored by loading the information from memory, and the MMX instruction can continue execution from the MMX state that is remaining. However, state restoration from memory will take a large number of CPU cycles and is very costly in terms of system performance.

The term "context switch" as used herein will refer to the state saving and restoring process. It should be noted that the floating point/MMX state does not have to be saved and then restored for certain types of instructions to execute. The present invention may have less utility in these cases where the loss of the state information does not affect the correctness of the execution of the code. The present invention is a technique that rapidly saves and restores the state of the floating point/MMX unit if it is determined by the programmer that the floating point/MMX state must be preserved.

The FPU circuitry within Intel x86 architecture microprocessors provide the user with an FPU data register file, having eight, 80 bit FPU data registers, which are accessed in a stack-like manner. The floating point registers are visible, and available for use by the programmer. The Intel architecture also provides a 16 bit control register and 16 bit status register. A data register tag word is also provided that contains eight, 2 bit fields, each associated with one of the eight data registers. The tag word is used to improve context switching and stack performance by maintaining empty/non-empty status for each of the eight data registers.

Further, the Intel architecture contains an instruction pointer to the memory location containing the instruction word and a data pointer to the memory location containing the operand associated with the current instruction (if any). Also, the last instruction opcode is stored in an eleven bit register. The aforementioned control register, status register, tag word, instruction pointer, data pointer and opcode define the floating point environment (ENV). This environment in combination with the floating point registers (REG) constitute the floating point state.

As noted above, when Intel architecture microprocessors execute MMX instructions the FPU registers are utilized for instruction computation. Thus, 64 bits of the 80 bit FPU registers will be utilized by MMX instructions. When a task switch from floating point operation to MMX, the environment and register state is saved using a floating point save (FNSAVE or FSAVE) instruction. A floating point store environment instruction (FNSTENV or FSTENV) will save the environment to memory. The FNSAVE instruction stores the floating point register state to main memory. The FNSTENV instruction stores the floating point environment to main memory. The floating point load environment (FLDENV) or floating point restore (FRSTOR) instructions are then executed to load the environment, or environment and registers, respectively, from main memory when floating point operations are to be resumed from the remaining state information. This context switching, due to the FLDENV and FRSTOR instructions, can cost as much as 32 to 95 CPU cycles, while the switching time due to instructions FNSTENV and FNSAVE can cost as much as 48 to 151 cycles. Thus, it can be seen that conventional techniques of saving and restoring the floating point context may take from 80 to 246 clock cycles to save the floating point state to main memory, and then restore the registers to their previous state, when switching between floating point and multimedia operations.

Usually, the FNSAVE and FRSTOR instructions are used in conjunction with one another, as are the FNSTENV and FLDENV instructions. It should be noted that FNSAVE, FRSTOR, FNSTENV and FLDENV instructions have been used by the Intel instruction set long before the introduction of MMX to the computer industry in 1996. These instructions become important to the execution of MMX instructions, since the MMX code shares floating point register usage with the Intel floating point instructions.

Therefore, a need exists for a technique that can quickly and efficiently save and restore the state of the floating point register file, when switching between floating point and multimedia operations, using a minimum number of clock cycles.

SUMMARY OF THE INVENTION

In contrast to the prior art, the present invention provides a system and method that reduces the latency associated with execution of save and load instructions, such as FNSAVE and FRSTOR, when switching tasks between floating point and multimedia operations.

Broadly, the present invention provides an additional floating point register set in the CPU. In this manner, when the CPU stores the floating point state, or environment as an image into memory, it also stores the state, or environment, as a copy in the additional internal registers. When the CPU needs to restore the state, or environment, the necessary information (data and/or instructions) in the additional registers, thus saving CPU cycles by avoiding reloading the image from main memory. As used herein, "on-chip image" will be used to refer to the state information as stored in the additional internal register set, and, "memory image" will be used as a reference to the state information as stored in main memory.

The present invention allows for either of the two register sets (or a combination thereof) to be, at a given point in time, the working set, with the other being a shadow register set. All of the memory write cycles are monitored (snooped) to determine if the information in the on-chip image has been altered, since the last store operation. If so, the memory image is loaded when a context switch occurs.

Generally, in single CPU systems an on chip memory write operation refers to the memory write which is generated from the CPU. It should be noted that, it is also possible for a bus master devices to generate a memory write operation in a single CPU system. However, the memory write operation generated from a bus master, other than the CPU, is note referred to as an on chip memory write.

The shadowed register file will allow the state of the floating point register file to be kept "as is" on the occurrence of a task switch to MMX, or another context. The present invention also provides environment and register pointer bits, along with environment and register dirty bits. These bits are stored in four, 1 bit registers.

There are two sets of registers in the architecture of the present invention, register set 0 and register set 1. Each set has its own floating point environment (ENV) registers and eight, 80 bit registers (REG) for floating point and/or multimedia instructions, i.e. MMX. A working register set constitutes the environment registers (control, status, tag, instruction/data pointers) and floating point registers from either set, which are being accessed by the processor. To the programmer, the working set is the visible floating point or MMX states. The shadowed register set constitutes environment registers and the floating point data registers which are not in the working set. The entire, or a portion of, the shadowed set is used to store the on-chip image, in response to the most recent FNSAVE or FSTENV instruction. In other words, the on-chip image is a subset of the shadowed set.

A snoop address register is provided which holds the address of the memory image from the most recent FNSAVE or FSTENV instruction. The environment pointer always points to the ENV registers of the working set, i.e. the bit is set=1 for environment register set 1 and set=0 for environment register set 0. The register pointer bit always points to the REG registers of the working set, i.e. floating point registers R0–R8. The environment dirty bit tracks the status of the environment registers of the shadowed set, while the register dirty bit tracks the status of the register of the shadowed set.

The pointer and dirty bits are used to facilitate the algorithm for the dual register set of the present invention. A new working set if formed by selectively picking the environment registers and floating point registers from both the working set and the shadowed set when one of the instructions FNSAVE, FRSTOR, FNSTENV of FLDENV are executed.

The present invention selectively picks the environment and registers using an algorithm which forms a new working set in a single CPU cycle. The present invention also maintains compatibility with the Intel x86 instruction set. It should be noted that the present invention allows for the dynamic creation of the working set from the environment of either register set 0 or 1 in combination with the register file from either register set 0 or 1. For example, the working set can include: the environment register from set 0 and the register file from set 0; the environment from set 1 and the register file from set 1; the environment from set 0 and the register file from set 1; or the environment from set 1 and the register file from register set 0.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

As noted previously, for microprocessors compatible with the Intel architecture, MMX instructions use the floating point unit (FPU) registers for instruction computation. Thus, a task switch may occur when the processor changes from executing FP instructions to MMX instructions, or vice versa. A task switch can also occur between various floating point tasks, where the state of the previous task must be saved by executing the FNSAVE instruction and restored by the FRSTOR instruction, or the like. For the purposes of clarity the present invention will be described using the example of a task switch between FP operations and MMX operations. However, the present invention contemplates task switches within the same context, e.g. floating point, and is useful in minimizing the number of clock cycles needed to save the previous state information when switching to another task, and restoring the first state when the operating system switches back to the first task.

It should be noted that context, or task switching can also be controlled by the operating system (OS), such as Windows 95, Windows NT, OS/2, or the like. When a context switch is desired, the operating system generates a trap which will be received by a trap handler. The trap handler then saves the state of the previous context by causing an FNSAVE instructions, FSTENV instructions, or the like to be executed. It should also be noted that task switching can occur within a single context. For example, a switch can occur between different tasks in the floating point context. Similarly, task switching can also occur entirely within the MMX context.

Figure 1:
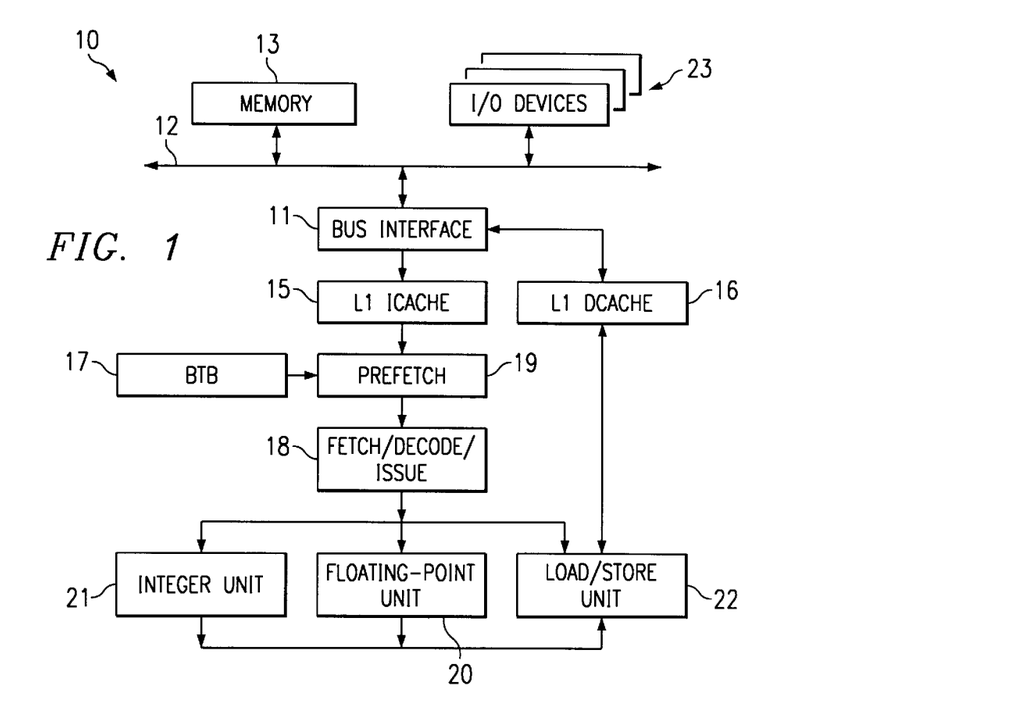
FIG. 1 is a block diagram of an exemplary microprocessor capable of implementing the preferred embodiments of the present invention.

Referring to FIG. 1, a block diagram of an exemplary microprocessor capable of executing the Intel instruction set and implementing the present invention is shown generally by reference numeral 10. Those skilled in the art will understand that many other differently configured microprocessors can also be utilized to implement the present invention.

Bus interface unit (BIU) 11 interfaces the microprocessor components with a system bus 12. Main memory 13 and various input/output devices 23 are also connected to bus 12. I/O devices may include a diskette drive, keyboard, mouse, parallel port, and the like. Control, address and data information is transmitted from microprocessor 10 onto bus 12 via BIU 11. Further, control, address and data signals from memory 13 and I/O devices 23 are received by BIU 11 for use by microprocessor 10. It should be noted that the control, address and data information will include microprocessor instructions, as well as operand data which will be manipulated by the instructions.

Memory management is provided by determining the physical address using an addressing mode which calculates an offset address often referred to as an effective address. Depending on the operating mode of the CPU, the offset is then combined using memory management mechanisms to create a physical address that actually addresses the physical memory device(s). A memory management unit (MMU) (not shown) typically includes a translation lookaside buffer (TLB) which is a cache for the paging mechanism. In a typical microprocessor, similar to the one shown in FIG. 1, the TLB is a page table cache that automatically keeps the most commonly used page table entries in the processor. An address calculation unit is also provided for memory management operations and is used to calculate the physical address by computing an offset address (effective address). Generally, the effective address is calculated by adding together up to three values: a base, an index and a displacement. The base, if present, is the value in one of the 32 bit general registers at the time of the execution of the instruction. The index is also a value contained in one of the 32 bit general purpose registers. The index differs from the base in that the index is first multiplied by a scale factor of 1, 2, 4 or 8 before the summation is made. The third component added to the memory address calculation is the displacement which is a value of up to 32 bits which is supplied as part of the instruction.

Load/store functions are implemented by load/store unit 22 which executes load and store instructions on an arithmetic logic unit (ALU). Load and store instructions include load string (LODS), load task register (LTR), move data (MOV), and the like. Store instructions include store task register (STR), store string (STOS), and the like. Generally, load instructions retrieve data and/or instructions from cache/memory and place the information in one of the microprocessor registers, while store instructions place data and/or instructions into a cache/memory location from the microprocessor registers. Integer unit 21 may perform address calculations for the load and store instructions.

It should be noted that microprocessor 10 of FIG. 1 includes a hierarchical memory subsystem. The memory subsystem includes a level one (L1) instruction cache 15 and data cache 16 which provide the instructions and data to the execution units (FPU 20, Integer Unit 21 and Load/Store unit 22). An off chip level two (L2) cache (not shown) is usually provided. While the L2 cache is smaller than main memory 13, retrieving information likely to be used by the processor from the L2 cache is much faster than loading the information from main memory. Main memory 13 is the last level of storage in the memory subsystem. Memory 13 is the largest storage area, but also requires the greatest number of cycles to be accessed by the microprocessor.

More particularly, level one (L1) instruction cache 15 is included in microprocessor 10, as shown in FIG. 1. Cache 15 can be configured to run in write-through mode, or in a higher performance write-back mode. The write-back mode optimizes performance of the CPU core by eliminating bus bottlenecks caused by unnecessary external write cycles. Write-through cache architectures require that all writes to the cache also update external memory simultaneously. These unnecessary write cycles create bottle necks which can result in CPU stall and adversely impact performance. In contrast, a write-back architecture allows data to be written to the cache without updating external memory. With a write-back cache external write cycles are only required when a cache miss occurs, a modified line is replaced in the cache, or when an external bus master requires access to data. Cache 15 stores instructions only in order to provide faster and less complex retrieval of instructions. Four-way set associative architecture and a least recently used (LRU) algorithm are used in cache 15. Of course, cache 15 can be operated in write-through mode when desired. The line size of cache 15 may be 16 bytes and new lines are only allocated during memory read cycles. Valid status is then maintained on a 16 byte cache line basis, but modified or "dirty" status for write-back mode is maintained on a 4-byte (double word) status. Therefore, only the double words that have been modified are written back to external memory when a line is replaced in the cache. The CPU can access the cache in a single internal clock cycle for both reads and writes.

Level one (L1) data cache 16 is also provided, as shown in FIG. 1. As noted above, instructions and data are stored separately in the L1 cache in order to increase performance. Cache 16 is also a four way set associative cache having, for example, a 16 byte line size and uses a least recently used (LRU) replacement algorithm.

Instruction cache 15 is connected to an instruction prefetch buffer 19 which is provided to store microprocessor instructions prior to their being fetched by instruction fetch/decode unit 18. Instructions are loaded into the buffer by being "prefetched" from the instruction stream. As instructions are fetched by unit 18, new instructions are loaded into the buffer. This ensures that the executions units will always have a continuous supply of instructions and prevents any "bubbles" from occurring in the pipeline. A branch target buffer 17 is used to predict the target address of a "branch"

or "jump" instruction. That is, the target address is precalculated (predicted) and stored in buffer 17. Thus, when an unconditional branch is taken, or a conditional branch instruction is encountered, the address for the next (non-sequential) instruction is already known and available for use by the corresponding execution unit (floating point or integer).

Figure 2:
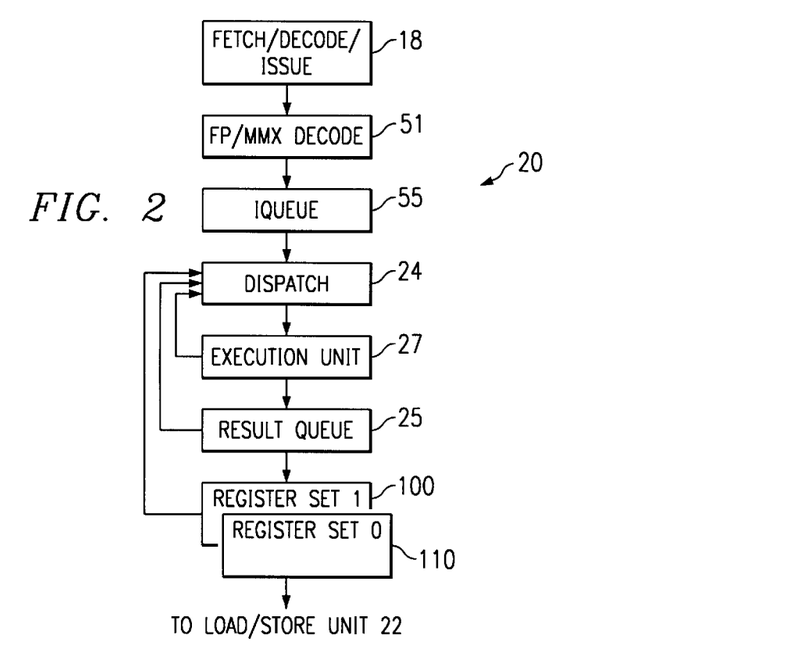
FIG. 2 is a block diagram of the floating point unit of the microprocessor of FIG. 1.

In addition to being fetched by unit 18, the instructions are also decoded and issued, or dispatched. For example, load/store instructions are issued to load/store unit 22 for execution, the integer unit 21 for memory address calculation, and to a memory control unit, or the like, for scheduling. Additional integer instructions, such as add (ADD), multiply (IMUL), move (MOV) and the like are also issued by fetch/decode/issue unit 18 to integer unit 21. Floating point unit 20 receives the issued floating point instructions from unit 18 for execution thereon. The floating point unit 20 includes an execution unit 27 (FIG. 2). FPU 20 includes eight 80 bit registers with a 64 bit interface and is capable of parallel execution. The exemplary Intel architecture floating point unit 20 uses the x87 instruction set and is compatible with IEEE standard 754. Load/store unit 22 includes a snooping mechanism that ensures coherency of data throughout the memory subsystem. The present invention utilizes this snooping mechanism, as described in more detail below.

Referring to FIG. 2, a block diagram of floating point unit 20 of microprocessor 10 is shown. As can be seen from FIG. 2, floating point and MMX instructions will both be executed by FPU 20. Floating point/MMX instructions are issued from fetch/decode/issue unit 18, where they have been pre-decoded to determine that they are either floating point or MMX instructions. Additional circuitry is provided in this stage to designate the use of floating point register set 0, 110 and/or register set 1, 100. The Floating Point/MMX instructions are then associated with their corresponding operand data in FP register set 100, 110, as the case may be.

FP/MMX decode unit 51 receives the predecoded instructions from fetch/decode/issue unit 18, as discussed above. Floating point/MMX instructions are then fully decoded in Floating Point/MMX decode unit 51. The instruction is then stored in floating point/MMX instruction queue 55 prior to being dispatched for processing on execution unit 27. Dispatch unit 24 will determine when instructions from FP instruction queue 55 are to be provided to execution unit 27. The instructions are then provided to execution unit 27 for execution. The instructions (floating point or MMX) are then executed by floating point execution unit 27. Execution unit 27 performs typical floating point operations, such as Add Multiply, Shift, absolute value, negative number operations, and the like. The output of FP execution unit 27 is provided to a result queue 25 where the execution result will be buffered. The result data from result queue 25 will be written back to the register files 100, 110, in a manner as designated by the fetch/decode/issues stage 18. Additionally, intermediate result data can be provided directly from execution unit 27, result queue 25 or register sets 100, 110 to dispatch unit 24, when further processing is needed. The microprocessor will typically be initialized with the floating point or MMX instructions updating the FP register file 110. Floating point or MMX store instructions will write the completed result from the register files 100, 110 back to main memory through load/store unit 22.

Figure 3:
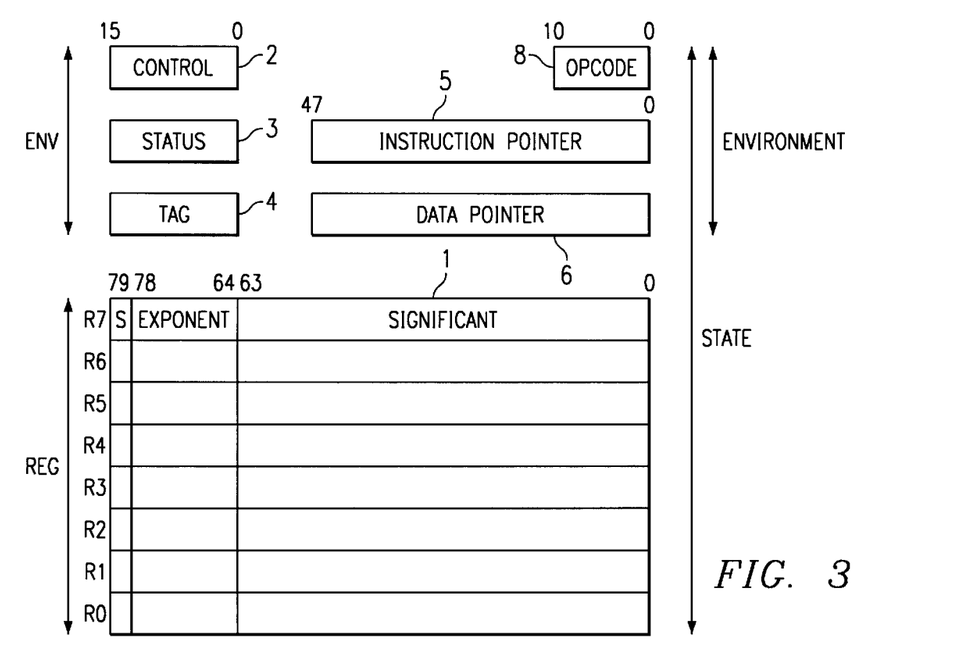
FIG. 3 is a block diagram of the floating point state including the floating point register and floating point environment.

Referring to FIG. 3, the FPU circuitry within Intel x86 architecture microprocessors provide the user with an FPU data register file 1, having eight, 80 bit FPU data registers R0–R7, which are accessed in a stack-like manner. A sixteen bit control register 2 and sixteen bit status register 3 are also provided. Data register tag word 4 contains eight, 2 bit fields, each associated with one of the eight data registers R0–R7. The tag word is used to designate status, such as empty/non-empty, or the like for each of the eight data registers.

Also shown in FIG. 3, is an instruction pointer 5 to the memory location containing the current instruction word and a data pointer 6 to the memory location containing the operand associated with the current instruction (if any). An eleven bit opcode register 8 is also shown that contains the opcode of the last executed instruction. As seen in FIG. 3, control register 2, status register 3, tag word register 4, instruction pointer 5, data pointer 6 and opcode register 8 are the environment. The combination of register file 1 with the above noted environment registers comprise the floating point state.

Referring more specifically to FIG. 3, a tag field (not shown) is used to associate each of the eight 2-bit fields in the tag word with one of the physical data registers in FPU data register file 1. Tag word register 4 is comprised of two bits for each physical data register. Tag word fields (0–7 of the tag field) assume one of four values depending on the contents of their associated register (R0–R7), i.e. Valid (00), Zero (01), Special (10), and Empty (11). Special values include Denormal, Infinity, QNaN, SNaN and unsupported formats. Tag values are maintained transparently by the Intel microprocessors and are only available to the programmer indirectly through the FSTENV and FSAVE instructions.

The FPU circuitry communicates information about its status and the results of operations to other functional units in the microprocessor via status register 3. The FPU status register is comprised of bit fields that reflect exception status, operation execution status, register status, operand class and comparison results. This register is continuously accessible to the microprocessor CPU, i.e. integer unit, regardless of the state of the control or execution units.

FPU mode control register 2 is used by the CPU to specify the operating mode of the FPU. Control register 2 contains bit fields which specify the rounding mode to be used, the precision (single or double) by which to calculate results and the exception condition which should be reported to the CPU via traps. The user controls precision, rounding and exception reporting by setting or clearing the appropriate bits in control register 2. For additional information see the ST486DX/DX2 Databook, published by SGS-THOMSON Microelectronics, Inc. and the Pentium Processor Family Developer's Manual, published by Intel Corporation, both hereby incorporated by reference.

Figure 4:
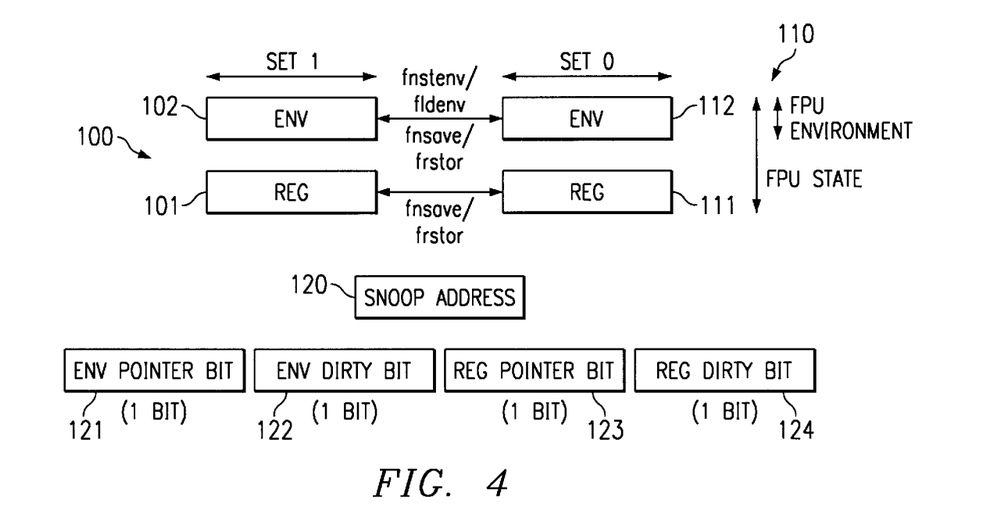
FIG. 4 shows the dual register sets of the present invention including the FPR, environment, snoop address register, dirty and pointer bit registers.

The dual register set of the present invention is shown in FIG. 4. Register Set 0 is shown by reference numeral 110 and register set 1 is designated by reference numeral 100. Register set 110 includes a register file 111 having eight, 80 bit registers and a set of environment registers 112 (control, status, tag, opcode, instruction pointer, data pointer), which function in the manner described previously in conjunction with FIG. 3. Register set 100 includes environment registers 102 and register file 101 which are functionally identical to the environment registers 112 and register file 111 of register set 110. Those skilled in the art will understand how decoding the FNSAVE, FRSTOR, FSTENV, FLDENV instructions will drive a state machine, or the like, to set the pointer bit(s) that will determine whether register set 0 or 1 (or some combination thereof) is the working set, and the dirty bit(s) that determine if the state information associated with the previous task must be loaded from memory.

Further, an additional translation step is included in the present invention which determines, for each instruction being executed in the floating point unit, the value of the pointer bits and, therefore, which register set (0 or 1) to access.

The present invention also includes a snoop address register 120 which stores a memory address corresponding the FP state (register file and environment) and/or the FP environment which is saved as the result of an FNSAVE or FSTENV instruction, respectively. The address in register 120 is snooped to determine whether the saved information has been modified. In accordance with the present invention, the state of a previous task can be restored from an "on-chip" image, unless the information in memory is modified. When the saved memory information is modified the floating point state, must be restored from memory.

Referring more specifically to FIG. 4, a block diagram of register set 0, 110 is shown having environment registers 112 and register file 111. Register set 1, 100 is also shown with environment registers 102 and register file 101. Floating point instructions, FNSTENV/FLDENV correspond to environment registers 102 and 112 only, since they respectively store and load the environment. The FNSAVE and FRSTOR, instructions are associated with both the environment registers 102, 112 and register files 101, 111, because these instructions respectively save and restore the environment registers and register file.

A snoop address register 120 is also illustrated by FIG. 4 and will include the address of the shadowed register set (invisible to the programmer) such that any modification of the information corresponding to this address will cause the information to be considered "dirty" and necessitate a memory load to restore the previous context.

Environment pointer bit register 121 indicates which environment register 102 or 112 in register set 0 or register set 1 is the working environment and which is the shadowed environment. A logical 0 in register 121 means that ENV 112 is the working environment register, while a logical 1 indicates that ENV 102 is the working environment. Similarly, pointer bit register 123 indicates which register file 101 or 111 in register set 0 or register set 1 is the working register file and which is the shadowed register file. Again, a logical 0 in register 123 indicates the REG 111 is the working file and a logical 1 will mean that REG 101 is the working file.

Environment register dirty bit register 122 and register file dirty bit 122 are both are set=1 when the CPU is reset. Then, dirty bits are then turned off, set=0, for a newly created on-chip image for a corresponding register file. That is, when an on-chip image is created (ENV 102 or 112 is saved as the shadowed ENV) then the ENV dirty bit register is set=0. Similarly, the REG dirty bit register is also set=0 for the corresponding register file, REG 101 or 111 saved as the shadowed register file. If another instruction or operation then modifies the shadowed ENV or REG, the corresponding bit is flipped to a logical 1, thereby indicating that the saved information has been modified and the state must be restored from main memory upon a context switch. In this manner, the ENV and REG dirty bits track the status of the shadowed ENV and REG, respectively.

For example, when the shadowed register set is saved as an on-chip image, ENV dirty bit register 122 and REG dirty bit register 124 are then set=0 and the memory address of the shadowed register set is stored in snoop address register 120. Upon the occurrence of a snoop hit, the dirty bits in registers 122 and/or 124 are set=1 indicating that the on-chip image has been modified and must be loaded from memory when a task switch occurs.

The pointer bits and dirty bits are used to facilitate the algorithm for the dual register set of the present invention. A new working set is formed by selectively picking ENV and REG registers from both the working set and/or shadowed set when one of the FNSAVE, FSTENV, FRSTOR, FLDENV instructions are executed. The algorithm of the present invention forms a new working set in a single CPU cycle while maintaining instruction compatibility.

Generally, the algorithm flips the bits in the pointer registers 121, 123 when either an FNSAVE instruction (saves the environment registers and register file) or an FSTENV instruction (stores the environment registers) is executed. Further, if the instruction is either an FRSTOR (restores the environment registers and register file) or an FLDENV (loads the environment registers), and a match occurs with the snoop address register (stored information has not been modified), and the dirty bits are off (set=0). It should be noted that for an FRSTOR both the ENV and REG dirty bits in registers 121, 123, must be off, and for an FLDENV only the ENV dirty bit in register 121 needs to be off.

The algorithm of the present invention controls the dirty bits by turning them on (set=1) or off (set=0). For a newly created on-chip image, the corresponding dirty bit(s) in registers 122, 124 are turned off. Dirty bits, for an on-chip image, turn on when the corresponding memory image is modified. Both the ENV dirty bit in register 122 and REG dirty bit in register 124 are turned on when the CPU is reset.

The operation of the present invention will now be described in conjunction with the actual execution of the FNSAVE, FNSTENV, FRSTOR and FLDENV instructions on the microprocessor 10.

For the purposes of describing the present invention it will be assumed that initially the working register set={ENV[env_ptr], REG[reg_ptr]}. FNSAVE is then processed and the CPU prepares switching over to the shadowed register set by initializing the environment pointer, ENV[~env_ptr] and copying the current working set REG pointer, REG[reg_ptr] over to REG[~reg_ptr], i.e. setting register pointer bit 123 equal to the value (0 or 1) corresponding to the working register set. This initialization and copying is a requirement for the FNSAVE instruction at the instruction level and is necessary to maintain compatibility with the instruction set architecture. The CPU then overwrites the snoop address register 120 with the store address from the FNSAVE instruction. The ENV pointer bit in register 121 and REG pointer bit in register 123 are then flipped to form a new working set ={ENV[env_ptr], REG[reg_ptr]}is formed. The ENV and REG dirty bits in registers 122, 124 are then turned off and a new on-chip image={ENV[~env_ptr], REG[~reg_ptr]} is created. All of the previously described operations occur in one CPU cycle.

Pseudo-code for FNSAVE:

```
ENV[~env_ptr] = INIT_ENVIRONMENT
REG[~reg_ptr] = REG[reg_ptr]
SNOOP_REG.address = FNSAVE_address
env_tr = ~env_ptr
reg_tr = ~reg_ptr
env_dirty = 0
reg_dirty = 0
```

Next, the store environment instruction (FSTENV) will be described. Again, the working set will initially be set ={ENV[env_ptr], REG[reg_ptr]}. The FNSTENV instruction is then processed and the CPU prepares switching over to the new working set by setting the previous environment pointer bit value for the working set as the new environment bit pointer in register 121, ENV[env_ptr] to ENV[~env_ptr]. Again, this copy-over is a requirement FSTENV at the instruction level to ensure compatibility. The CPU then overwrites the snoop address register 120 with the address from the FSTENV instruction. The ENV pointer bit is then flipped and a new working set={ENV[env_ptr], REG[reg_ptr]} is formed. It should be noted that the FSTENV instruction only stores the environment and not the register file, therefore, only the ENV pointer bit in register 121 is flipped to create the new working set. Next, the ENV dirty bit in register 122 is turned off (0) and the REG dirty bit is register 124 is turned on (1) and a new on-chip image is formed={ENV[~env_ptr]}. Again, since FSTENV only stores the environment registers, the ENV dirty bit is the only one that is set=0. Therefore, the new on-chip image will include only the environment registers, as shown in FIG. 3. These operations associated with execution of the FSTENV instruction all occur in a single CPU cycle.
Pseudo-code for FSTENV:

```
ENV[~env_ptr] = ENV[env_ptr]
SNOOP_REG.address = FNSTENV_address
env_ptr = ~env_ptr
env_dirty = 0
reg_dirty = 1
```

When the state of the execution unit is to be restored an FRSTOR instruction is processed. Initially, the working set={ENV[env_ptr], REG[reg_ptr]} and FRSTOR is then processed. The CPU compares the data address from the FRSTOR instruction encoding against the address in snoop register 120. The CPU also looks up the values in both the ENV dirty bit register 122 and REG dirty bit register 124. The ENV pointer bit in register 121 and REG pointer bit in register 123 are then flipped, and the ENV dirty bit in register 122 and REG dirty bit in register 124 are turned on, only when: (1) the address comparison between snoop address register 120 and FRSTOR instruction is a match; and (2) both the dirty bits in registers 122, 124 are determined to be off (0). This indicates that neither the memory image nor the on-chip image has not been modified and the state and be restored from the shadowed register set. A new working set={ENV[env_ptr], REG[reg_ptr]}, and a new shadowed set={ENV[~env_ptr], REG[~reg_ptr] } are formed. These operations associated with FRSTOR all happen within one CPU clock cycle If either the snoop address does not match the FRSTOR address, or either of the dirty bits in registers 122, 124 are turned on (1), then the pointer and dirty bits are not changed and the state is loaded from memory.
Pseudo-code for FRSTOR:

```
if((SNOOP_REG.address == FRSTOR_address) &&!(env_dirty
|| reg_dirty)) then
    env_ptr = ~env_ptr
    reg_ptr = ~reg_ptr
    env_dirty = 1
    reg_dirty = 1
else
    ENV[env_ptr] = MEMOR[FRSTOR_address].ENV
    REG[reg_ptr] = MEMORY[FRSTOR_address].REG
endif
```

The operation of the present invention for loading the save environment by processing the FLDENV instruction will now be described. Initially, the working set={ENV[env_ptr], REG[reg_ptr]}. The FLDENV instruction is then processed. The CPU compares the data address from the FLDENV instruction encoding against the address in snoop register 120. The CPU also looks up the ENV dirty bit in register 122 to determine if it is still off. The ENV pointer bit in register 121 is flipped and both the ENV dirty bit and REG dirty bits are turned on (1), only when: (1) the address comparison between the FLDENV address and the address in snoop register 120 is a match; and (2) the ENV dirty bit in register 122 is turned off (0). A new working set={ENV[env_ptr], REG[reg_ptr]} and a new shadowed set ={ENV[~env_ptr], REG[~reg_ptr]} are then formed. These operations, associated with the FLDENV instruction, all occur in a single CPU cycle. If the snoop address comparison with the FLDENV address in not a match, or the ENV dirty bit in register 122 is on (1), then the pointer and dirty bits are not changed and the environment is loaded from memory.
Pseudo-code for FLDENV:

```
if((SNOOP_REG.address == FLDENV_adress) &&!env_dirty)) then
    env_ptr = ~env_ptr
    env_dirty = 1
    reg_dirty = 1
else
    ENV[env_ptr] = MEMORY[FLDENV_adress}.ENV
endif
```

The CPU is reset with the control bits initialized as follows: (1) ENV pointer in register 121=0; (2) ENV dirty bit in register 122=0; (3) REG pointer in register 123=0; and (4) REG dirty bit in register 124=1. These bits are initially set to these values and will remain there until one of either the FNSAVE, FRSTOR, FSTENV or FLDENV instructions are executed. Basically, the pointer bits set=0 indicate that the initial working set for the CPU will be register set 0, 100 (FIGS. 2 and 4). By initializing the dirty bits=1 this means that data will initially be loaded from memory into the current working set (register 0 at initialization), if either the FRSTOR or FLDENV instruction were the first instructions to be executed.
Pseudo-code for CPU reset:

```
ENV[0] = RESET_ENVIRONMENT
REG[0] = RESET_REGISTERS
env_dirty = 1
reg_dirty = 1
SNOOP_REG.address = XXXXXXXX
env_ptr = 0
reg_ptr = 0
```

When snooping the address register 120, the CPU looks at every memory write cycle. If the floating point state memory image (ENV and REG) is being written, both the ENV dirty bit in register 122 and REG dirty bit in register 124 will be turned on (1) in the same CPU cycle. If the floating point environment memory image (ENV only) is being written to, the ENV dirty bit in register 122 will be turned on (1) in a single CPU cycle.

Figure 5:
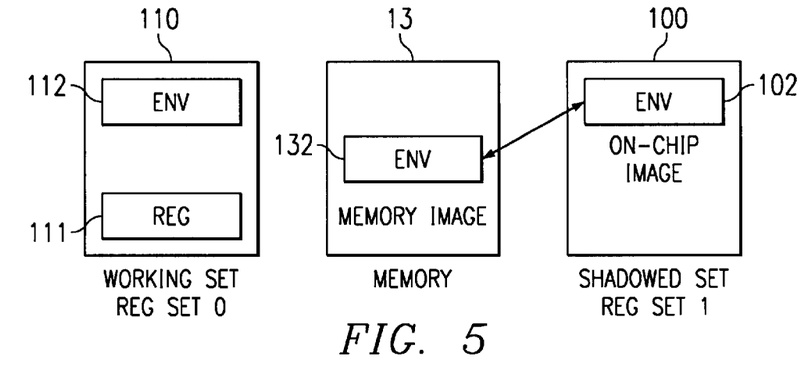
FIG. 5 is a block diagram showing the relationship between the working set registers, shadowed set and memory when an FSTENV instruction has been processed.

Referring to FIG. 5, the present invention is shown with register set 0, 110 as the working set. The working set 110 includes ENV registers 112 and REG file 111. In FIG. 5, the FSTENV instruction has been executed thereby storing the ENV to a location 132 in memory 13. Register set 1, 100, including ENV registers 102 is the shadowed register set and constitutes the on-chip image. For an FSTENV instruction the on-chip image will be the ENV only, since that is what is stored. When an FNSAVE instruction is executed, the on-chip image will be both the ENV and REG, since the entire FP state is saved by this instruction. Therefore, it can be seen that the on-chip image is a subset of the shadowed registers. If there is no snoop address match and if the ENV dirty bit in register 122 is turned off, then the floating point environment can be restored from the ENV registers 102 of the on-chip image when the previous state is loaded (FLDENV) due to the occurrence of a context switch (pointer bits flip).

Figure 6:
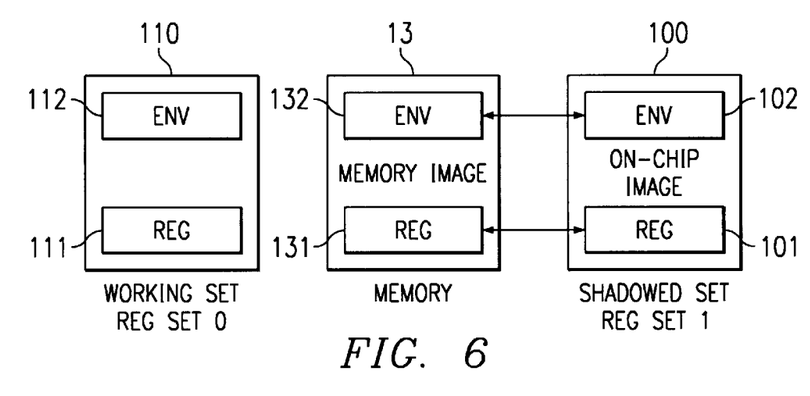
FIG. 6 is another block diagram of the relationship between the working set, shadowed set and memory when an FNSAVE instruction has been executed.

FIG. 6 illustrates the relationship of the working set, memory and shadowed set when the entire state is saved, i.e. FNSAVE instruction is executed. Again, it is assumed that register set 0, 110 is the working set and the CPU is accessing ENV registers 112 and REG file 111 to execute instructions, such as floating point or MMX (depending on the context). When the context is to switch an FNSAVE instruction is executed and both the ENV 112 and REG 111 (state) are stored in memory 13 at locations 132, 131, respectively. In this case the on-chip image is a copy of the memory image, with ENV registers 102 including the same information as memory location 132 and REG file 101 having identical information to memory location 131. Upon execution of an FRSTOR instruction, the CPU checks the snoop address with the FRSTOR address and determines if the ENV and REG dirty bits are off. If there have been no snoop hits and the dirty bits are off, then the context can be restored from the on-chip image.

For the purposes of clarity it has been shown in FIGS. 5 and 6 that the working set includes ENV and REG registers corresponding to register set 0 and the shadowed set includes ENV and REG registers that are physically part of register set 1.

Figure 7:
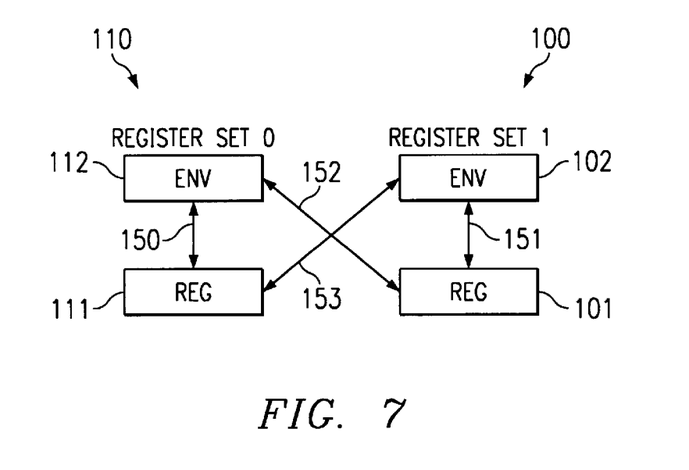
FIG. 7 is a block diagram showing one preferred embodiment of the present invention wherein the working set can include an environment from either register set 0 or 1 and a register file from the other register set 1 or 0, respectively.

As described above, either register set 0 or register set 1 will be designated as the working or shadowed set. However, the present invention also comprehends the configuration where a working set may include the ENV registers from register set 0 and the REG register from register set 1, i.e. the working set may consist of ENV 112 and REG 101. This would occur if ENV pointer bit is set=0 and REG pointer bit is set=1. In this case, ENV 102 and REG 111 would be the shadowed set. Of course, ENV register 102 and REG register 111 could also be designated as the working set with ENV 112 and REG 101 being the shadowed set, when the ENV pointer bit is set=1 and the REG pointer bit is set=0. This preferred embodiment is shown in FIG. 7. When both the ENV and REG pointer bits are set=0, then register set 0, 110 is the working set and ENV 112 operates with REG 111 as shown by reference numeral 150. If both pointer bits are set=1, then register set 100 is the working set, as can be seen by reference numeral 151. However, when ENV bit is set=0 and REG bit is set=1, then the working set is ENV 112 and REG 101, as shown by reference 152. Similarly, reference numeral 153 shows the instance when the ENV pointer is set=1 and REG pointer is set=0. Thus, the present invention provides a great deal of flexibility by enabling dynamic selection of the registers that will make up the working set and shadowed set.

Figure 8:
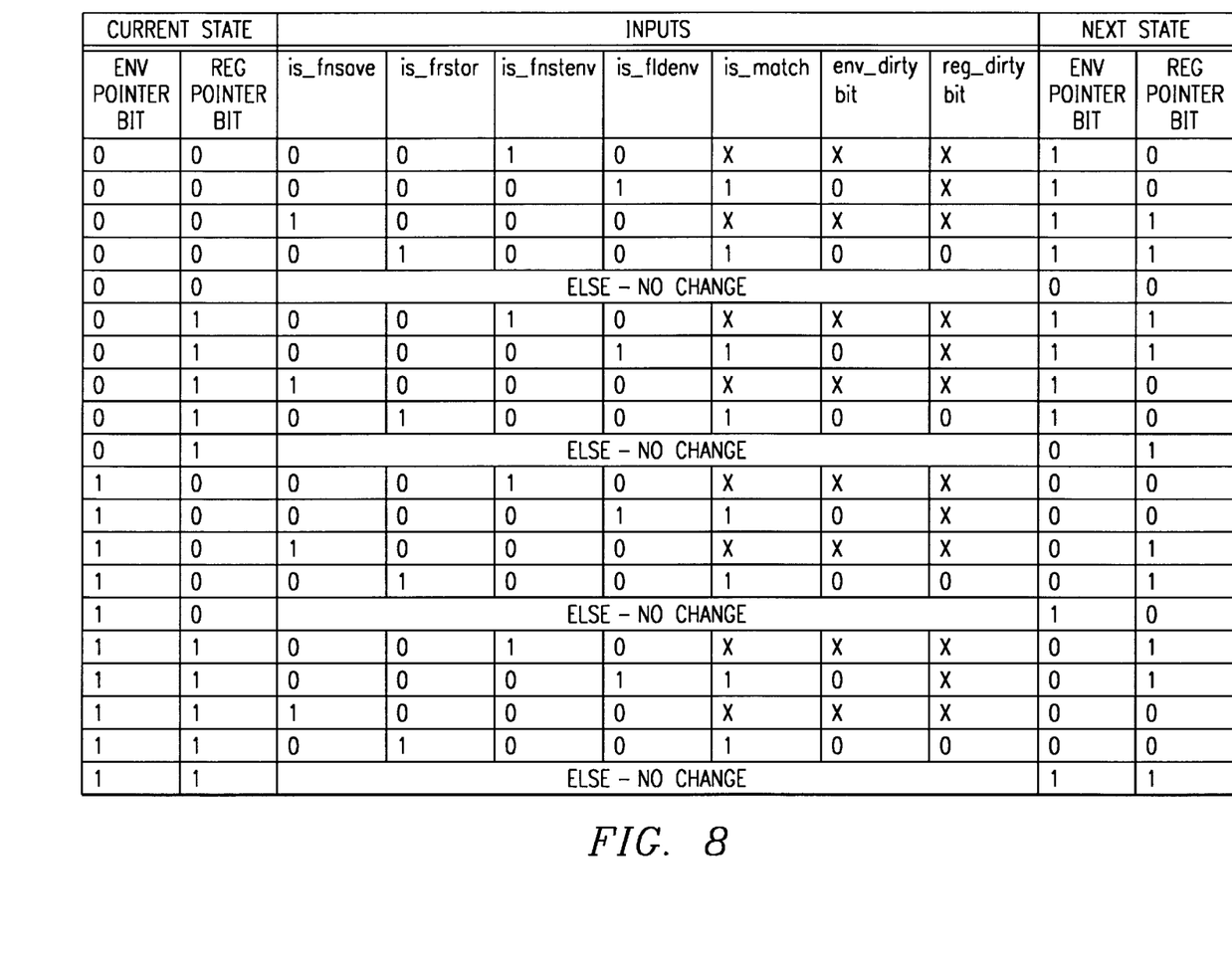
FIG. 8 is a state machine table that defines a state machine for controlling the pointer bits.

Referring to FIG. 8, a 2 bit, pointer bit state machine is shown which will be used to explain the operation of the present invention relative to how the ENV and REG pointer bits in registers 121 and 123, respectively, are set. The state machine is organized as "Current State", "Inputs" and "Next State", "X" refers to a "don't care" value (can be either logical 0 or logical 1). There will be four possible current states, i.e., register set 0 is the working set; register set 1 is the working set; the ENV of register set 0 and REG of register set 1 is the working set; and the ENV of register set 1 and REG of register set 0 is the working set. The state machine does not address the case where a snoop hit occurs and the saved address does not match the restore address. This is because the state must be restored from memory and all pointer and dirty bits are unchanged. ENV and REG dirty bits are provided by the present invention to address the situation of a snoop hit occurring wherein the saved information is modified.

The pointer state machine of FIG. 8 provides an implementation of the process previously described with reference to the pseudo-code corresponding to each of the FNSAVE, FRSTOR, FSTENV, FLDENV instructions.

The current state values correspond to the present ENV and REG pointer bits, the next state values correspond to the logical value that the ENV and REG pointer are driven to, based on the instructions being executed. The input values correspond to which instructions are being executed (FNSAVE, FRSTOR, FSTENV, FLDENV), whether a snoop hit occurs and the state of the ENV and REG dirty bits.

In the initial current state (of the pointer bit registers 121, 123) both the REG and ENV bits are set=0 (0, 0) such that the working set is register set 0, 110. When a store ENV (FSTENV) instruction is executed there is no snoop hit (is_match) because the storing of the ENV is being implemented and the env_dirty bit and reg_dirty bits are don't care. Therefore, when only the ENV is saved, the ENV pointer bit in register 121 is the only pointer affected. Thus, the next state is (1, 0). When a load ENV (FLDENV) is executed and the snooping mechanism determines that the saved ENV address is the same (match) as the address in the load instruction, then the next state remains at (1, 0) because the ENV can be loaded from the "on-chip" image. Next, for the case of an FNSAVE instructions, both the REG and ENV pointer bits are flipped from (0, 0) to (1, 1) because this instruction saves both the REG and ENV states. When the saved state is to be restored by an FRSTOR instructions and an address match occurs, then the ENV and REG bits remain in the next state of (1, 1). If none of the above conditions are met (ELSE), then there is no change in ENV and REG pointer bit values. It should be noted that the FNSAVE, FRSTOR, FSTENV and FLDENV instructions execute in a mutually exclusive manner such that only one of the fields corresponding to these instructions in the state machine can be active at one time.

The next possible current state is when the ENV is from register set 0 and the REG is from register set (1, 0). Again, the FSTENV instruction will only affect the ENV pointer bit and the next state is flipped to the ENV from register set 1, with the REG pointer remaining the same. Thus, the next state will be (1, 1). The FLDENV instruction will also only affect the ENV pointer bit and for address matches the next state will also be (1, 1). For the FNSAVE and FRSTOR instructions, both the ENV and REG pointer bits are affected and will be flipped such that the next state for both of these cases is (1, 0). If none of the above conditions occur, then the current state is unchanged.

When the current state uses the ENV from register set 1 and REG from register set 0 (1, 0), the FSTENV and FLDENV instructions will flip the ENV pointer bits to cause the next state to be (0, 0). While, the FNSAVE and FRSTOR instructions affect both the ENV and REG pointer bits causing them to be changed to (0, 1) for the next state. If these conditions do not occur, then there is no change.

Finally, when the working set is register set 1 (ENV and REG set=1), (1, 1), the FSTENV and FLDENV instructions will save and restore only the ENV state and the ENV pointer bit will be flipped to 0, causing the next state to be (0, 1). Again, the FNSAVE and FRSTOR instructions will cause both the ENV and REG bits to be flipped and the next state will becomes (0, 0). Otherwise, there is no change in the REG and ENV pointer bit values and they will remain at (1, 1). As previously noted, there are four states in this state machine—state 00, state 01, state 10 and state 11. The states are encoded so that the encoded state bits are the pointer-bits. The most significant bit (leftmost bit) corresponds to ENV pointer bit while the least significant bit (rightmost bit) corresponds to REG pointer bit. For instance if the state machine is in state 10, then the working set comprises environment registers from register set 1, data register file from register set 0. The input signals used to drive the state machine are is_fnsave, is_frstor, is_fnstenv, is_fldenv, is_match, env_dirty and reg_dirty. The signals is_fnsave, is_frstor, is_fnstenv, is_fldenv are generated from fetch/decode/issue stage 18, and only one of them can be high (1) at a time. Signal is_match signifies that an address match is found between the address from snoop register and the address from the source operand of either FRSTOR or FLDENV instructions. Signals env_dirty and reg_dirty is the current state bits of the dirty-bit state machine.

The pointer bit state machine makes a transition out of a state if either: (1) the FNSAVE instruction is found at the decode stage; or (2) the FRSTOR instruction is found at the decode stage. It can also be seen that the on-chip image has the state which FRSTOR intended to restore (signified by signal is_match) and the memory content of the on-chip image has not been modified since last state saving operation (signified by both signal env_dirty and reg_dirty being low). In the state diagram (FIG. 10) conditions (1) and (2) are "ORed" together as signal "s" signifying it is state related. The pointer bit state machine also makes a transition out of a state when: (3) an FNSTENV instruction is found at the decode stage; or (4) an FLDENV instruction is found at the decode stage. It is also found that the on-chip image includes the environment data which FLDENV intended to restore (signified by signal is_match) and the memory content of the on-chip image has not been modified since last state saving (signified by signal env_dirty being low). In the state diagram (FIG. 10) conditions (3) and (4) are "ORed" together as signal "e" signifying it is environment data related. The state machine stays in its original state in all other cases. The state transition conditions are associated with each state transition arc in FIG. 10.

Figure 9:
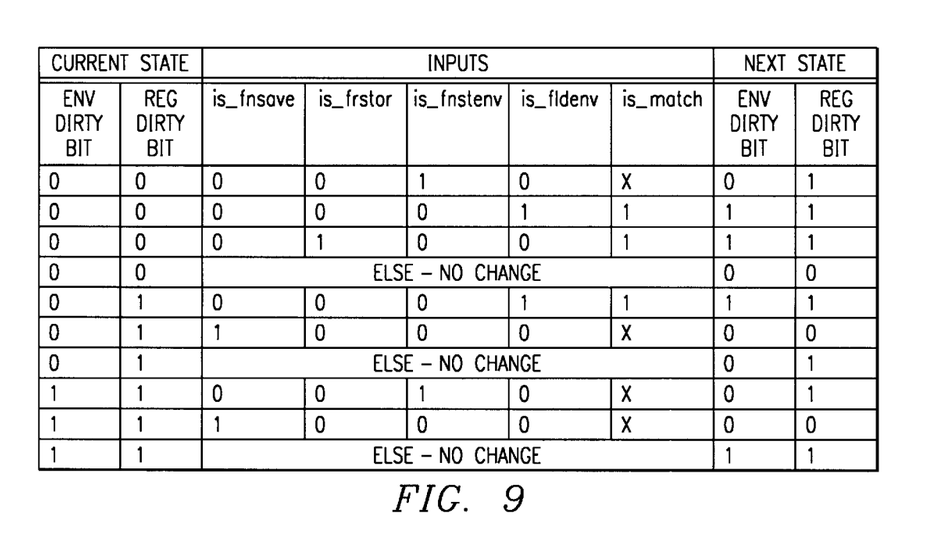
FIG. 9 is another state machine table which provides a mechanism for controlling the dirty bits.

Referring to FIG. 9, a 2 bit, dirty bit state machine is shown and will now be described. As with the pointer state machine of FIG. 8, the FNSAVE, FRSTOR, FSTENV and FLDENV instructions are mutually exclusive and only on can be active at a single time. In general, the dirty bits attach to the shadowed working set. When the ENV dirty bit from register 122 and/or the REG dirty bit from register 124 is on, set=1, then the corresponding environment or register information must be retrieved from memory. For example, when ENV dirty bit 122 is logical 1, then, upon a task switch, the ENV for the task being switched to must be restored from memory. The actual bits in dirty bit registers 122, 124 become a logical 1 for two reasons: (1) the bits are set=1 for some "don't care" instances to prevent its use; and (2) when an actual snoop hit occurs.

The dirty bit state machine of FIG. 9 shows an implementation of the process previously described with reference to the pseudo-code corresponding to each of the FNSAVE, FRSTOR, FSTENV, FLDENV instructions. Many of the "don't care" situations for the dirty bit state machine have been deleted from FIG. 9.

For the first current state shown in FIG. 9, the ENV dirty bit in register 122 and REG dirty bit in register 124 are set=0, indicating that there has been no snoop hit and the saved information from the previous state has not been modified. For the FSTENV instruction it does not matter if the address of the saved ENV information is a match, since there is not any information being restored. The CPU overwrites the snoop address register 120 with the FSTENV store address and the ENV dirty bit remains off with the REG dirty bit turned on to create a new on-chip image that consists of the stored ENV information. When the FLDENV instruction is executed, the CPU compares the FLDENV data address with the snoop address and looks up the ENV dirty bit. The ENV and REG dirty bits are turned on (1) when the address comparison is a match and the ENV dirty bit is off (0). Since the current state has the ENV dirty bit set=0 and a match did occur (is_match), then both the ENV and REG dirty bits are set=1 (1, 1). When an FRSTOR instruction executes the CPU compares the data address in the restore instruction with the address in the snoop register 120. Both the ENV and REG dirty bits are turned on to the next state (1, 1) when they are both initially off and an address match has occurred. When none of the above conditions occur (ELSE), then there is no change and the next state of the ENV and REG dirty bits remains at (0, 0).

The next current state of the dirty bits is when the ENV dirty bit is set=0 and the REG dirty is set=1, indicating that the stored REG state has been modified. In this case, when an FLDENV instruction occurs and there is an address match, and the ENV dirty bit is off (0), then both the ENV and REG dirty bits are turned on (set=1), (1, 1) to the next state. For an FNSAVE instruction it does not matter whether an address match occurs, because the address of the snoop register 120 is being overwritten with the FNSAVE address. The ENV and REG dirty bits are both turned off and a new on-chip image is formed. If neither of the above conditions are met when the current state of the ENV and REG dirty bits is (0, 1), then the next state is unchanged from the current state and remains at (0, 1).

When the current state of the ENV and REG dirty bits is (1, 1), and a FSTENV instruction is executed, the CPU overwrites the snoop register 120 with the store address from the FSTENV instruction. The ENV dirty bit is turned off (0) and the REG dirty bit is turned on (1). Therefore, the next state is the ENV dirty bit set=0 with the REG dirty bit remaining set=1, i.e. (0, 1). For an FNSAVE instruction, the address of the snoop register is also overwritten with the store address from the FNSAVE instruction. The ENV and REG dirty bits are set=0, (0, 0). If these conditions are not met (ELSE), then no change occurs and the next state is the same as the current state, i.e. (1, 1).

There are three states in this dirty bit state machine—state 00, state 01 and state 11. The states are encoded so that the encoded state bits are the dirty-bits. The most significant bit (leftmost bit) corresponds to ENV dirty bit while the least significant bit (rightmost bit) corresponds to REG dirty bit. For instance if the state machine is in state 01, then environment registers in the shadowed set are marked non-dirty and the data register file in the shadowed set is marked dirty. The input signals used to drive the state machine are is_fnsave, is_frstor, is_fnstenv, is_fldenv, is_match. The signals is_fnsave, is_frstor, is_fnstenv, is_fldenv are generated from fetch/decode/issue stage 18, and only one of them can be high (1) at a time. Signal is_match signifies that an address match is found between the address from snoop register and the address from the source operand of either FRSTOR or FLDENV instructions.

The dirty bit state machine makes transition from state 00 to state 11 if either FRSTOR or FLDENV instruction is found at decode stage and the on-chip image has the state or environment data which either the FRSTOR or FLDENV instruction intended to restore. Both the environment dirty bit and register dirty bit are marked high to signify that the shadowed set does not have a valid on-chip image after the restoration. Transition from state 00 to state 01 is made if the FSTENV instruction is found at the decode stage. The environment dirty bit is marked low to signify that the environment registers from the shadowed set are part of the on-chip image. The register dirty bit is marked high to signify that the register file in the shadowed set is not part of the on-chip image. Otherwise, the state machine stays in state 00.

The dirty bit state machine makes the transition from state 11 to state 00 if an FNSAVE instruction is found at the decode stage. Both the environment dirty bit and register dirty bit are marked low to signify that both the environment registers and register file in the shadowed set are part of the on-chip image. Transition from state 11 to state 01 is made if the FSTENV instruction is found at the decode stage. The environment dirty bit is marked low to signify that the environment registers from the shadowed set are part of the on-chip image. The register dirty bit is marked high to signify that the register file in the shadowed set is not part of the on-chip image. Otherwise, the state machine stays in state 11.

The dirty bit state machine makes the transition from state 01 to state 00 if the FNSAVE instruction is found at the decode stage. Both the environment dirty bit and register dirty bit are marked low to signify that both environment registers and register file from the shadowed set are part of the on-chip image. Transition from state 01 to state 11 occurs if the FLDENV instruction is found at the decode stage and the on-chip image includes the environment data which FLDENV intends to restore. Both the environment dirty bit and register dirty bit are marked high to signify that the shadowed set does not have a valid on-chip image. Otherwise, the state machine stays in state 01.

Figure 10:
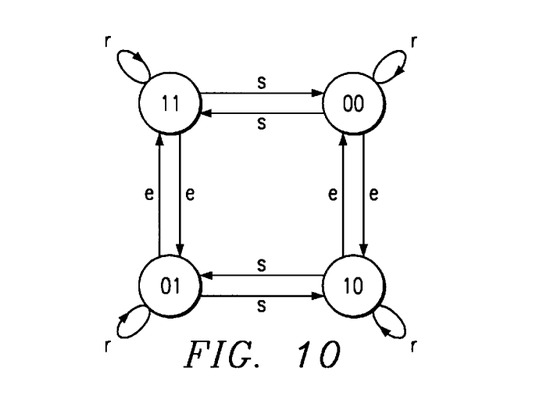
FIG. 10 is a state diagram of the mechanism for controlling the pointer bits.

Referring to FIG. 10, a state diagram is shown for the pointer bit state machine of FIG. 8. Each of the four possible pointer bit states are shown, with the first character representing the ENV pointer in register 121 and the second character representing the REG pointer in register 123. For example, state (0, 0) indicates that the ENV pointer and REG pointer are both set=0 such that register set 0 is the working set. State (1, 1) indicates that register set 1 is the working set, since both the ENV and REG pointers reference ENV register 102 and REG register 101. State (1, 0) means that the working set includes ENV register 102 and REG 111, or a combination of register sets 1 and 0. Similarly, state (0, 1) includes ENV register 112 and REG 101 such that a combination of register 1 and 0 is designated as the working set.

The three signals used in the state diagram of FIG. 10 are defined as: (s)—where the instruction is an FNSAVE and the FRSTOR instruction address matches the snoop register address and both the ENV and REG dirty bits are off {is_fnsave || (is_frstor && is_match && !env_dirty && !reg_dirty)}; (e)—the instruction is FNSTENV and the FLDENV instruction address matches the snoop register address and the ENV dirty bit is off {is_fnstenv || (is_fldenv && is_match && !env_dirty)}; and (r)—the result of the functions (s) and (r) is 0, {!(s || e)}, and no change in state will occur.

It can be seen from the state diagram of FIG. 10 that the FNSAVE instruction and corresponding FRSTOR instruction, as embodied in signal (s) will cause both of the ENV and REG pointer bits to change state. For example, state (0, 0) will change to state (1, 1) when signal (s) is applied. Also, state (1, 1) will change to (0, 0) when signal (s) is applied. Similarly, state (0, 1) will become (1, 0) and state (1, 0) will become (0, 1) in response to signal (s). As previously described the FNSAVE instruction and FRSTOR instruction will save and restore both the ENV registers and REG register file, thus both the ENV and REG pointer bits must change state in response to these instructions.

However, the FNSTENV and FLDENV instructions only store and load the ENV state information. Thus, only the ENV pointer bit will change state in response to the application of signal (e). From FIG. 10, it can seen that state (1, 1) will become state (0, 1) and state (0, 1) will return to state (1, 1) in response to signal (e). Also, state (0, 0) will become state (1, 0) when signal (e) is applied. Likewise, signal (e) will cause (1, 0) to become (0, 0). In each case where signal (e) is utilized, the FNSTENV and FLDENV instructions cause only the first pointer bit (ENV) in register 121 to be changed, while the REG pointer bit in register 123 remains constant. In all cases the (r) signal will not cause any change in the state of the ENV and REG pointer bits.

Figure 11:
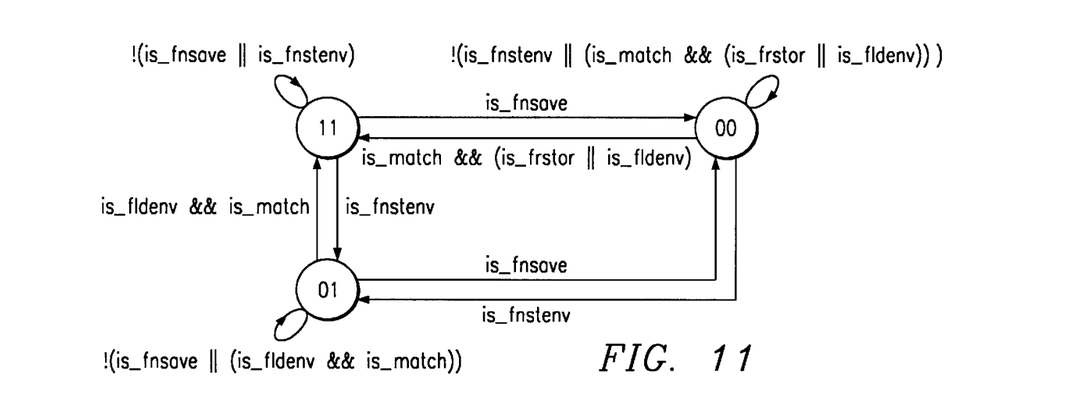
FIG. 11 is another state diagram that shows how the state of the dirty bits is controlled.

Referring to FIG. 11, a state diagram is shown which represents the dirty bit state machine of FIG. 9. The three possible states are shown, i.e. (0, 0), (0, 1) and (1, 1). In order to change states from (0, 0) to (1, 1), the state machine determines that a match exists between either the FRSTOR or FLDENV encoded address and the address in snoop address register 120 {is_match && (is_frstor || is_fldenv)}. In this case both the ENV and REG dirty bits are set=1. A state change from (1, 1) to (0, 0), occurs when the instruction is determined to be an FNSAVE (is_fnsave).

A state change from (0, 1) to (1, 1) occurs when the address in an FLDENV instruction and the snoop address in register 120 are a match (is_fldenv && is_match). The state change from (1, 1) to (0, 1) will occur upon the execution of an FNSTENV instructions (is_fnstenv). State (0, 1) becomes (0, 0) upon the occurrence of a save instruction (is_fnsave), while the state change form (0, 0) to (0, 1) occurs when a store environment instruction is executed (is_fnstenv).

State (0, 0) will be maintained when the instruction is a store environment (FNSTENV) and the address encoded in either of a corresponding restore instruction or load environment instruction (FRSTOR, FLDENV) matches the address in the snoop register {!(is_fnstenv || (is_match && (is_frstor || is_fldenv)))}.

State (1, 1) will remain unchanged when the instruction is a save state or save environment instruction (FNSAVE or FNSTENV), {!(is_fnsave || is_fnstenv)}.

Finally, state (0, 1) will be unchanged when the save instruction is being executed (FNSAVE) and the encoded address in a load environment (FLDENV) instruction matches the address in the snoop register 120 {!(is_fnsave || (is_fldenv && is_match))}.

Some examples of the operation of a microprocessor implementing the present invention will now be described. For these exemplary scenarios, it is noted that programmers do not have to follow the memory stack model of the Intel architecture. Under the memory stack model, the instructions FNSAVE/FRSTOR or FNSTENV/FLDENV, appear in pairs. The inner most store always being followed by a load retrieving data from the store address.

In these examples, the following notations will apply: (1) Snoop Reg. for the Snoop Address Register; (2) ENV ptr for ENV pointer; (3) ENV drt for ENV dirty bit; (4) REG ptr for REG pointer; (5) REG drt for REG dirty bit; (6) What Happened means that when something in this column happened, its results to the Snoop Reg., ENV ptr, or the like will be recorded on the corresponding row; (7) Load from Memory indicates the source of the image being loaded, "No" means the image is loaded from internal private registers (restored from the shadowed register set) and "Yes" means the image is loaded from memory; (8) "X" means the value is "don't care"; and (9) [Address] means that the symbol inside the brackets [ ] is an address.

The first example will follow the previously described memory stack model:

EXAMPLE 1

| Snoop Reg ENV ptr | ENV drt | REG ptr | REG drt | What Happened | Load from Memory |
|---|---|---|---|---|---|
| X | 0 | 1 | 0 | 1 reset | |
| A | 1 | 0 | 1 | 0 fnsave[A] | |
| A | 0 | 1 | 0 | 1 frstor[A] | No |
| B | 1 | 0 | 1 | 0 fnsave[B] | |
| B | 1 | 0 | 1 | 1 Store to REG memory image | |
| B | 1 | 0 | 1 | 1 frstor[B] | Yes |

In this example, the restore instruction (frstor[A]) loads the floating point state from internal private registers ENV and REG (shadowed set that maintained the state of the previous task, which is now being resumed). Both dirty bits get turned on (set=1) by frstor[A], as well. However the restore instruction that includes address B (frstor[B]), loads the floating point state from memory since the REG image in memory has been modified (snoop hit). The frstor[B] instruction does not advance the circular buffer since it loads the image from memory.

The next example also follows the memory stack model.

EXAMPLE 2

| Snoop Reg ENV ptr | ENV drt | REG ptr | REG drt | What Happened | Load from Memory |
|---|---|---|---|---|---|
| X | 0 | 1 | 0 | 1 reset | |
| A | 1 | 0 | 0 | 1 fnstenv[A] | |
| A | 0 | 1 | 0 | 1 fldenv[A] | No |
| B | 1 | 0 | 0 | 1 fnstenv[B] | |
| B | 0 | 1 | 0 | 1 fldenv[B] | No |

In this case, the load environment instruction "fldenv[A]" loads the floating point environment from the internal private registers of the on-chip image (ENV). Since there was an intervening store environment instruction to address B, the load environment instruction (fldenv[B}) can also load the floating point environment from the private internal registers of the on-chip image.

The third example, does not follow the memory stack model and consecutive save and load instructions are permitted.

EXAMPLE 3

| Snoop Reg ENV ptr | ENV drt | REG ptr | REG drt | What Happened | Load from Memory |
|---|---|---|---|---|---|
| X | 0 | 1 | 0 | 1 reset | |
| B | 1 | 0 | 0 | 1 fnsave[B] | |
| A | 0 | 0 | 0 | 0 fnsave[A] | |
| B | 1 | 0 | 0 | 1 fnstenv[B] | |
| B | 0 | 1 | 0 | 1 frstor[B] | Yes, re-load from memory image |

In this example, by the time the store environment to address B (fnstenv[B]) is executed, the working set is the ENV of register set 1 and the REG file of register set 0. Therefore, the on-chip image is the opposite combination of the ENV register of register set 0 and the REG file for register 1, which corresponds to the shadowed set. The ENV register of the on-chip image/shadowed set (ENV register of set 0) is marked dirty after the store environment instruction (fstenv[B]) is executed. The REG file of register set 1 remains unmodified because it is not affected by the store environment instruction, FSTENV and will maintain its portion of the on-chip image which occurred due to the execution of the save instruction to address A (fnsave[A]). Thus, the frstor[B] instruction will have to re-load the floating point state from memory even though an address match is present, i.e. it must reload from memory because the on-chip image of the REG file is controlled by the previous fnsave[A] instruction and the subsequent fstenv instruction does not affect the REG file.

Example four does not follow the memory stack model and also addresses the possibility of consecutive save/store instructions.

EXAMPLE 4

| Snoop Reg ENV ptr | ENV drt | REG ptr | REG drt | What Happened | Load from Memory |
|---|---|---|---|---|---|
| X | 0 | 1 | 0 | 1 reset | |
| A | 1 | 0 | 1 | 0 fnsave[A] | |
| A | 0 | 1 | 1 | 0 fldenv[A] | No |
| A | 0 | 1 | 1 | 0 frstor[A] | Yes |

In this case, the load environment instruction (fldenv[A]) attempts to re-load the ENV image that was previously saved by the save instruction (fnsave[A]). The load environment instruction is able to obtain the ENV image from the CPU internal private registers (on-chip image). Subsequent to the fldenv[A] instruction the working set is made up of the ENV registers from register set 0 and the REG file from register set 1. The ENV on-chip image of the save instruction fnsave[A] overlaps with the ENV register of the working set. Thus, it is possible that subsequent floating point instructions will alter the ENV on-chip image (due to its overlap with the working set) of the save instruction at address A (fnsave[A]). Therefore, the restore instruction (frstor[A]) loads the state image from memory to ensure program integrity.

As can be seen, the present invention provides a system and method for efficiently handling floating point save and restore instructions. At the instruction level, MMX instruction can be mixed with the FNSAVE, FRSTOR, FNSTENV and FLDENV instructions without any adverse consequences. The present invention contemplates that the FNSAVE, FRSTOR, FNSTENV and FLDENV instructions can be used to save/restore MMX state (environment and register file) and environment information in exactly the same way they are used in accordance with floating point state and environment. Therefore, the present invention is applicable to task switches between different contexts (MMX and Floating Point), as well as task switches within a single context (different tasks within the MMX or Floating Point context).

Rapid switching between floating point and MMX instructions is a relatively new problem facing the computer industry. The preferred embodiment of the present invention addresses this problem as presently defined. However, those skilled in the art will understand that as software vendors develop applications utilizing MMX instructions, other problems may arise. The scope of the claims of the present invention are intended to include any situation where system performance can be improved when switching from a first context to a second context and vice versa.

Although certain preferred embodiments have been shown and described, it should be understood that many changes and modifications can be made therein without departing from the scope of the appended claims.

What is claimed is:

1. A data processing unit, comprising:

means for designating a working register set and a shadow register set from any combination of a first register set including first environment registers and a first register file and a second register set including second environment registers and a second register file after decoding of an instruction;

means for performing a first task using said working register set;

means for storing said working register set corresponding to said first task in said shadow register set upon a switch to a second task;

means for determining whether said shadow register set is modified; and means for restoring said shadow register set upon a switch from said second task to said first task when said shadow register set is unmodified.

2. A data processing unit according to claim 1 wherein said means for determining comprises means for indicating that information included in any one of said first environment registers, said second environment registers, said first register file and said second register file has been modified.

3. A data processing unit according to claim 2 wherein said means for designating further comprises:

an environment pointer register for storing an environment pointer bit that designates whether said first environment registers or said second environment registers are included in said working set; and a register file pointer register for storing a register pointer bit that designates whether said first register file or said second register file is included in said working set.

4. A data processing unit according to claim 3 wherein said means for determining further comprises:

an environment dirty bit register for storing an environment dirty bit that indicates whether one of said first environment registers or said second environment registers have been modified; and a register file dirty bit register for storing a register dirty bit that indicates whether one of said first register file or said second register file has been modified.

5. A data processing unit according to claim 4 wherein said means for maintaining further comprises:

means for storing said working resister set corresponding to said first task in a memory.

6. A data processing unit according to claim 5 wherein said means for restoring comprises means for loading said working register set from said memory when said shadow register set has been modified upon a switch from said second task back to said first task.

7. A data processing unit according to claim 6 wherein said first task includes floating point operations and said second task includes multimedia operations.

8. A method for switching between a first task and a second task which are implemented on a data processing unit, comprising the steps of:

designating one of a first register set comprising a first environmental register and a first register file, a second register set comprising a second environmental register and a second register file, or a combination of said first register set and said second register set as a working register set after decoding of an instruction;

performing said first task using said working register set;

storing said working register set corresponding to said first task, in a shadow register set, upon a switch to said second task;

determining whether said first state information stored in said shadow register set is modified; and restoring said first state information from said shadow register set upon a switch from said second task to said first task when said first state information is unmodified.

9. A method according to claim 8 wherein said step of determining comprises the step of indicating that information included in any one of said first environment registers, said second environment registers, said first register file and said second register file has been modified.

10. A method according to claim 9 wherein said step of designating further comprises the steps of:

storing an environment pointer bit, in an environment pointer register, that designates whether said first environment registers or said second environment registers are included in said working set; and storing a register pointer bit, in a register file pointer register, that designates whether said first register file or said second register file is included in said working set.

11. A method according to claim 10 wherein said step of determining further comprises the steps of:

storing an environment dirty bit, in an environment dirty bit register, that indicates whether one of said first environment registers or said second environment registers have been modified; and storing a register dirty bit, in a register file dirty bit register, that indicates whether one of said first register file or said second register file has been modified.

12. A method according to claim 11 wherein said first task includes floating point operations and said second task includes multimedia operations.

* * * * *